US010896044B2

(12) United States Patent
Evers et al.

(10) Patent No.: US 10,896,044 B2
(45) Date of Patent: Jan. 19, 2021

(54) LOW LATENCY SYNCHRONIZATION FOR OPERATION CACHE AND INSTRUCTION CACHE FETCHING AND DECODING INSTRUCTIONS

(71) Applicant: Advanced Micro Devices, Inc., Santa Clara, CA (US)

(72) Inventors: Marius Evers, Santa Clara, CA (US); Dhanaraj Bapurao Tavare, Santa Clara, CA (US); Ashok Tirupathy Venkatachar, Santa Clara, CA (US); Arunachalam Annamalai, Santa Clara, CA (US); Donald A. Priore, Boxborough, MA (US); Douglas R. Williams, Mountain View, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 98 days.

(21) Appl. No.: 16/014,715

(22) Filed: Jun. 21, 2018

(65) Prior Publication Data

US 2019/0391813 A1 Dec. 26, 2019

(51) Int. Cl.
*G06F 9/38* (2018.01)

(52) U.S. Cl.
CPC .......... *G06F 9/3824* (2013.01); *G06F 9/3802* (2013.01); *G06F 9/3808* (2013.01);
(Continued)

(58) Field of Classification Search
CPC .............................. G06F 9/3808; G06F 9/3814
See application file for complete search history.

(56) References Cited

U.S. PATENT DOCUMENTS 6,192,465 B1   2/2001  Roberts
8,433,850 B2 *  4/2013  Rappoport .......... G06F 12/0864
                                                711/125
(Continued)

FOREIGN PATENT DOCUMENTS

EP       1072971 A2    1/2001
WO    2011-141837 A1   11/2011

OTHER PUBLICATIONS

Baruch Solomon, Avi Mendelson, Ronny Ronen, Doron Orenstien, and Yoav Almog. "Micro-Operation Cache: A Power Aware Frontend for Variable Instruction Length ISA" IEEE Transactions on Very Large Scale Integration (VLSI) Systems, vol. 11, No. 5, Oct. 2003 (Year: 2003).*

*Primary Examiner* — Jacob Petranek
(74) *Attorney, Agent, or Firm* — Volpe Koenig (57) ABSTRACT

The techniques described herein provide an instruction fetch and decode unit having an operation cache with low latency in switching between fetching decoded operations from the operation cache and fetching and decoding instructions using a decode unit. This low latency is accomplished through a synchronization mechanism that allows work to flow through both the operation cache path and the instruction cache path until that work is stopped due to needing to wait on output from the opposite path. The existence of decoupling buffers in the operation cache path and the instruction cache path allows work to be held until that work is cleared to proceed. Other improvements, such as a specially configured operation cache tag array that allows for detection of multiple hits in a single cycle, also improve latency by, for example, improving the speed at which entries are consumed from a prediction queue that stores predicted address blocks.

18 Claims, 6 Drawing Sheets

(52) U.S. Cl.
CPC .......... *G06F 9/3818* (2013.01); *G06F 9/3844* (2013.01); *G06F 9/3867* (2013.01)

(56) References Cited

U.S. PATENT DOCUMENTS

| | | |
|---|---|---|
| 2003/0009620 A1* | 1/2003 | Solomon ............... G06F 1/3203 711/118 |
| 2004/0154011 A1* | 8/2004 | Wang .................... G06F 9/3009 717/158 |
| 2006/0053245 A1 | 3/2006 | Solomon et al. |
| 2015/0100763 A1* | 4/2015 | Holm .................. G06F 9/30145 712/210 |
| 2015/0347308 A1 | 12/2015 | Venkumahanti et al. |
| 2018/0129629 A1* | 5/2018 | Sadasivam .............. G06F 15/82 |
| 2018/0165199 A1* | 6/2018 | Brandt ................ G06F 12/0831 |

\* cited by examiner

LOW LATENCY SYNCHRONIZATION FOR OPERATION CACHE AND INSTRUCTION CACHE FETCHING AND DECODING INSTRUCTIONS

BACKGROUND

A microprocessor instruction execution pipeline fetches instructions and decodes those instructions into micro-operations for execution. Instruction fetching and decoding consumes a great deal of power and can also act as a performance bottleneck. Improvements to instruction fetch and decode are constantly being made.

BRIEF DESCRIPTION OF THE DRAWINGS

A more detailed understanding may be had from the following description, given by way of example in conjunction with the accompanying drawings wherein.

DETAILED DESCRIPTION

An instruction fetch and decode unit includes an operation cache that stores previously decoded instructions and an instruction cache that stores undecoded instruction bytes. The instruction fetch and decode unit fetches instructions corresponding to predicted address blocks that are predicted by a branch predictor. The instruction fetch and decode unit includes a fetch control block that determines whether the predicted address block should be fetched from the operation cache path or the instruction cache path and which entries in those caches hold the associated instructions. The operation cache path is used when instructions are available in the operation cache. The operation cache path retrieves decoded micro-operations from the operation cache. The instruction cache path retrieves instruction bytes from the instruction cache and decodes those instruction bytes into micro-operations.

The fetch control logic examines a tag array of the operation cache to detect hits for the predicted address blocks. Due to special features of the fetch control logic described elsewhere herein, multiple hits are detectable in a single cycle in the case where more than one operation cache entry is required to fetch the predicted address block. For instructions for which no hits are found in the operation cache, the instruction cache path fetches instruction bytes from an instruction cache or higher level cache and decodes those instructions.

The fetch control logic generates operation cache queue entries. These entries indicate whether the instruction prior to the instruction address of the entry is to be serviced by the instruction cache path, and thus whether the operation cache path must wait for the instruction cache path to output the decoded operations for the prior instruction before outputting the decoded micro-operations for that operation cache queue entry. The fetch control logic also generates instruction cache queue entries for the instruction cache path, which indicates whether decoded micro-operations corresponding to the instructions of the instruction byte buffer entry must wait for the operation cache path to output micro-operations for prior instructions before being output themselves. Thus both paths know, for any particular decoded operation, whether such operation must wait for decoded operations from the opposite path to be output. This synchronization mechanism allows for the work to proceed in either path until that work needs to stall due to having to wait for the other path. The combination of the ability to detect multiple operation cache hits in a single cycle for the predicted address block and the synchronization mechanism allows for switching between the different paths with minimal latency.

Figure 1:
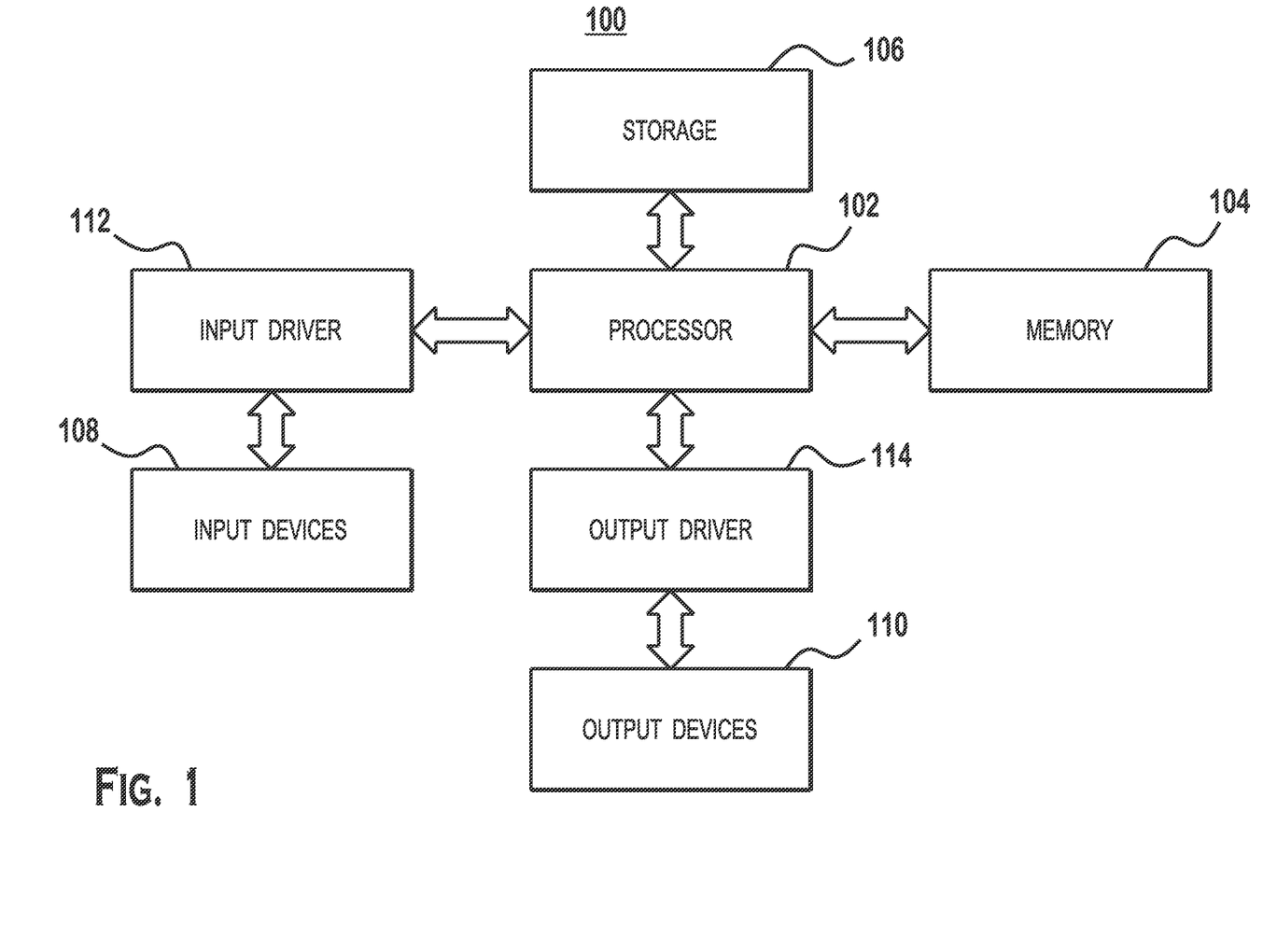
FIG. 1 is a block diagram of an example device in which one or more disclosed features may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 includes an input driver 112 and an output driver 114. It is understood that the device 100 may include additional components not shown in FIG. 1.

The processor 102 is a computing device capable of executing software, such as a microprocessor, microcontroller, or other device, as is known. The memory 104 stores instructions and data for use by the processor 102. In an example, the memory 104 is located on the same die as the processor 102. In another example, the memory 104 is located on a different die than the processor 102. The memory 104 includes a volatile memory, such as random access memory (RAM), dynamic RAM, or a cache. In some examples, the memory 104 includes non-volatile memory.

The storage device 106 includes a fixed or removable storage such as a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, a network connection (e.g., a wireless local area network card for transmission and/or reception of wireless IEEE 802 signals), and/or other input devices. The output devices 110 include a display, a speaker, a printer, a haptic feedback device, one or more lights, an antenna, a network connection (e.g., a wireless local area network card for transmission and/or reception of wireless IEEE 802 signals), and/or other output devices.

The input driver 112 communicates with the processor 102 and the input devices 108, and permits the processor 102 to receive input from the input devices 108. In various examples, the device 100 includes one or more than one input driver 112 (although only one is illustrated). The input driver 112 is embodied as custom, fixed function hardware, programmable hardware, software executing on a processor (such as processor 102), or any combination thereof. In various examples, an input driver 112 includes an expansion card inserted into a port such as a peripheral component interconnect express (PCIe) port, which is coupled both to the processor 102 and to an input device 108. The output driver 114 communicates with the processor 102 and the output devices 110, and permits the processor 102 to send output to the output devices 110. In various examples, the devices 100 includes one or more than one output driver 114 (although only one is illustrated). The output driver 114 is embodied as custom, fixed function hardware, programmable hardware, software executing on a processor (such as processor 102), or any combination thereof. In various examples, an output driver 114 includes an expansion card inserted into a port such as a peripheral component interconnect express (PCIe) port, which is coupled both to the processor 102 and to an input device 108.

Figure 2:
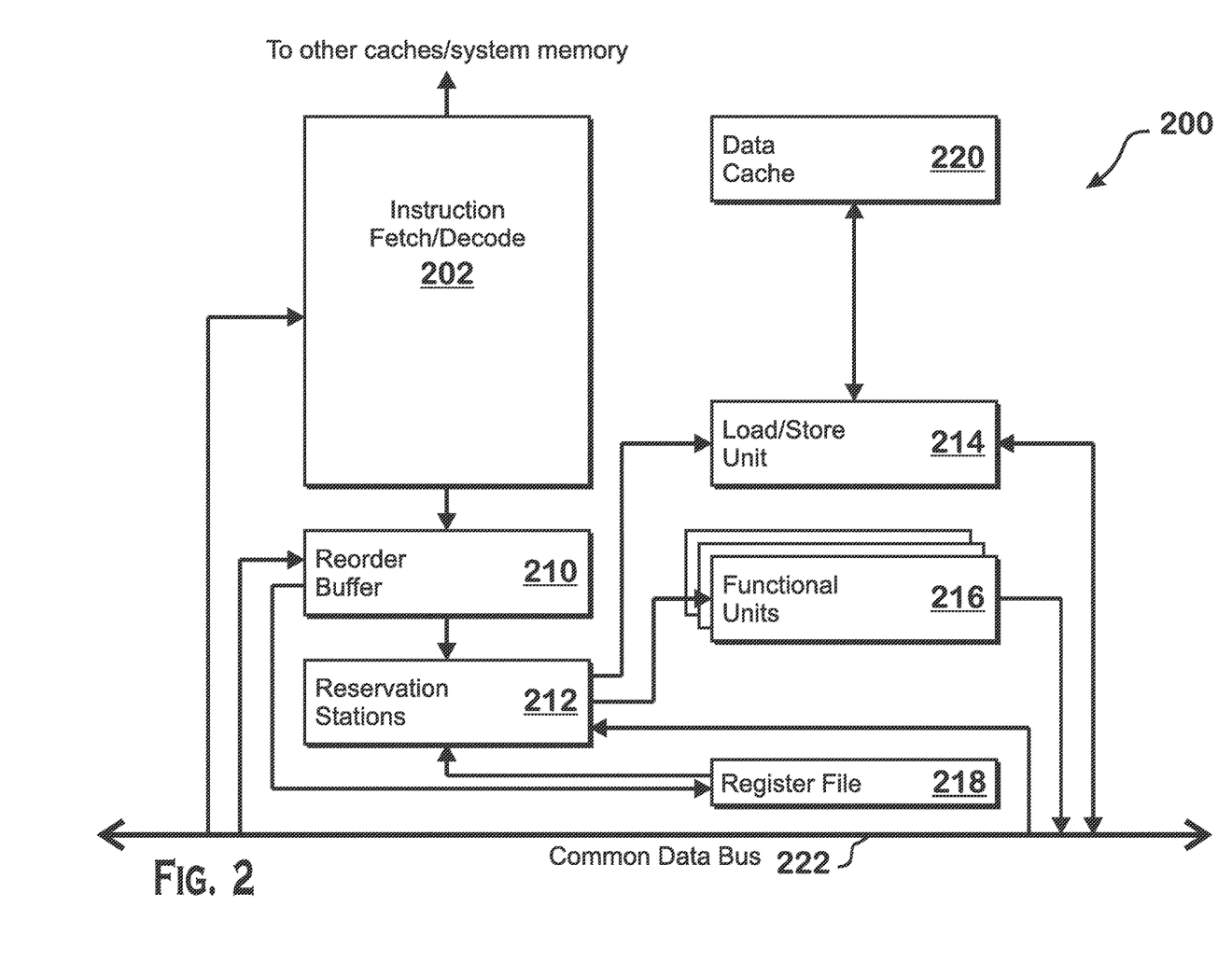
FIG. 2 is a block diagram of an instruction execution pipeline of the processor of FIG. 1, according to an example.

FIG. 2 is a block diagram of an instruction execution pipeline 200, included within the processor 102 of FIG. 1, according to an example. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch and decode unit 202 that fetches instructions from system memory (such as memory 104) via an instruction cache and decodes the fetched instructions. Decoding the fetched instructions converts the fetched instructions to micro-operations (also just "operations") for execution by the instruction execution pipeline 200. The term "instructions" refers to tasks that are specified in an instruction set architecture for the processor 102. Instructions can be specified for execution by software. Micro-operations are sub-tasks that are not generally directly usable by software. Instead, micro-operations are the individual tasks actually carried out by the processor 102 in order to perform the instructions requested by software. Decoding instructions thus includes identifying control signals to be applied to functional units 216, a load/store unit 214, and other portions of the instruction execution pipeline 200. Decoding some instructions results in multiple micro-operations per instruction, while decoding other instructions results in one micro-operation per instruction.

The execution pipeline 200 also includes functional units 216 that perform calculations to process the micro-operations, a load/store unit 214 that loads data from or stores data to system memory via a data cache 220 as specified by the micro-operations, and a register file 218 that includes registers that store working data for the micro-operations.

A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet "retired"—that is, have not yet had results committed to the architectural state of the processor (e.g., results written to architectural registers). When all micro-operations of an instruction have been performed, the instruction is considered to be retired. Reservation stations 212 maintain in-flight micro-operations and track operands for micro-operations. When all operands are ready for execution of a particular micro-operation, reservation stations 212 send the micro-operation to a functional unit 216 or a load/store unit 214 for execution.

Various elements of the instruction execution pipeline 200 communicate via a common data bus 222. For example, the functional units 216 and load/store unit 214 write results to the common data bus 222 which may be written to reservation stations 212 for execution of dependent instructions/micro-operations and to the reorder buffer 210 as the final processing result of an in-flight instruction that has finished execution.

In some techniques, the instruction fetch and decode unit 202 includes an operation cache that stores micro-operations corresponding to previously-decoded instructions. During operation, the instruction fetch and decode unit 202 checks the operation cache to determine whether decoded micro-operations are stored in the operation cache and outputs such found micro-operations instead of performing decoding operations for those instructions. Because decoding instructions is relatively power-hungry and high-latency, using the operation cache helps reduce power consumption and improve processing throughput.

One issue with the operation cache occurs due to the need to switch between using the operation cache when decoded micro-operations are present in the operation cache and fetching from the instruction cache and decoding those instructions in a decode unit when decoded micro-operations are not present in the operation cache. For a variety of reasons, some of which are described elsewhere herein, in some implementations, switching between fetching from the operation cache and decoding from the instruction cache can incur a several-cycle penalty. For this reason, techniques are provided herein to reduce the latency associated with switching between fetching decoded micro-operations from the operation cache and decoding instructions to generate micro-operations for instructions that do not have decoded micro-operations in the operation cache. While FIG. 2 shows one example of a processor pipeline 200 in which these techniques are applied, those of skill in the art will understand that the teachings of the present disclosure apply to other pipeline architectures as well.

Figure 3:
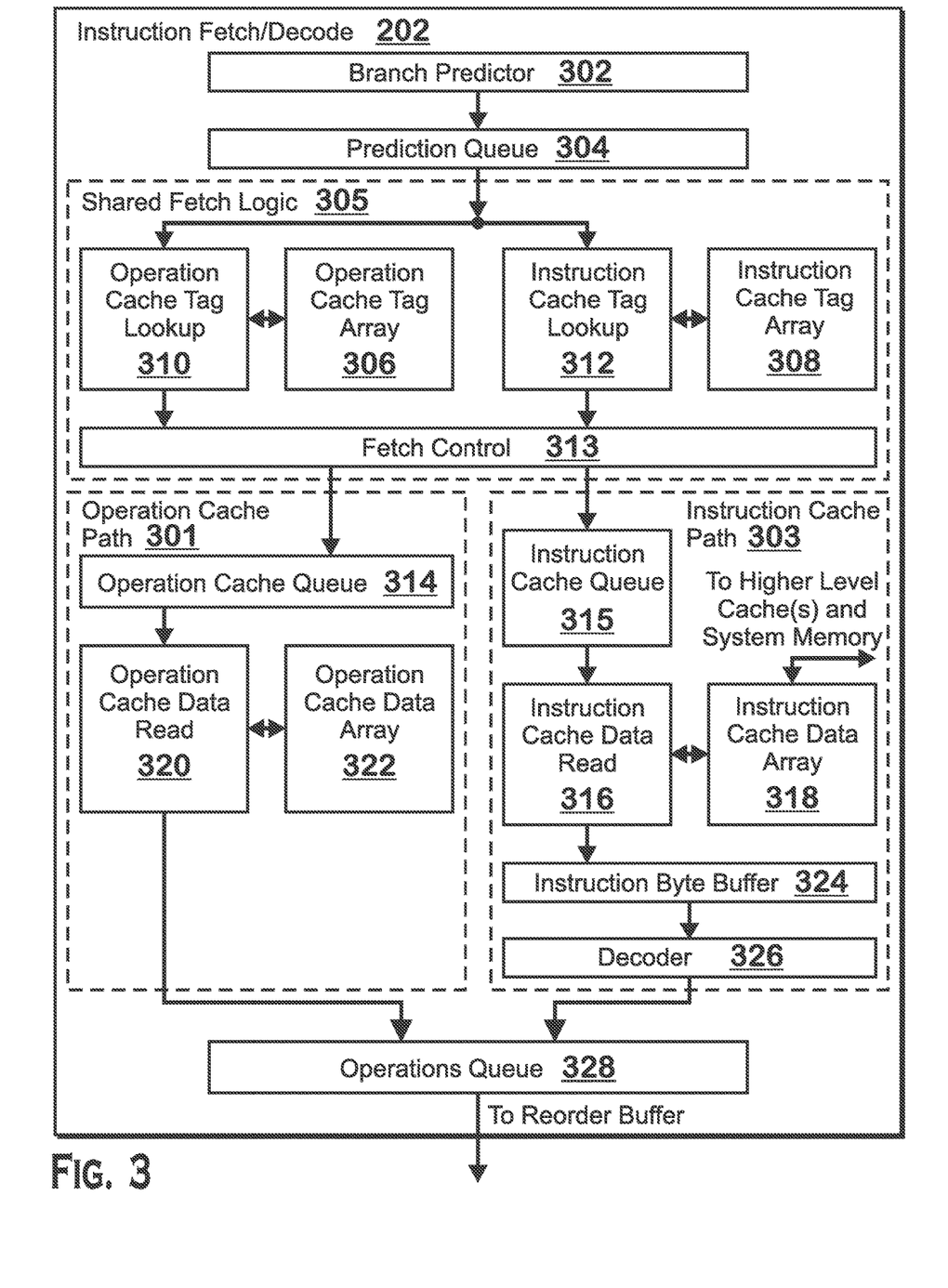
FIG. 3 is a block diagram illustrating components of the instruction fetch and decode unit of the instruction execution pipeline of FIG. 2, according to an example.

FIG. 3 is a block diagram illustrating components of the instruction fetch and decode unit 202, according to an example. The instruction fetch and decode unit 202 includes a branch predictor 302, a prediction queue 304, a shared fetch logic 305, an operation cache path 301, an instruction cache path 303, and an operations queue 328. The shared fetch logic 305 includes an operation cache tag lookup circuit 310, an operation cache tag array 306, an instruction cache tag lookup circuit 312, an instruction cache tag array 308, and a fetch control circuit 313. The operation cache path 301 includes an operation cache queue 314, an operation cache data read circuit 320, and an operation cache data array 322. The instruction cache path 303 includes an instruction cache queue 315, an instruction cache data read circuit 316, an instruction cache data array 318 which is communicatively coupled to higher level cache(s) and system memory, an instruction byte buffer 324, and a decoder 326. As used herein, the term "operation cache" refers to the combination of the operation cache tag lookup circuit 310, the operation cache tag array 306, the operation cache data read circuit 320, and the operation cache data array 322. As used herein, the term "instruction cache" refers to the combination of the instruction cache tag lookup circuit 312, the instruction cache tag array 308, the instruction cache data read circuit 316, and the instruction cache data array 318.

Any cache, such as the operation cache and the instruction cache, includes a tag array, which allows for a determination of whether a particular tag and index hits in the cache, and a data array, which stores the data for the cache. Thus, the operation cache includes the operation cache tag array 306 and the operation cache data array 322 and the instruction cache includes the instruction cache tag array 308 and the instruction cache data array 318. In various examples, any or all of the units illustrated in FIG. 3 are implemented as fixed-function hardware (i.e., as fixed-function circuits).

The branch predictor 302 generates predicted addresses for consumption by the rest of the instruction fetch and decode unit 202. Through known techniques, the branch predictor 302 attempts to identify the sequence of instructions, specified as a sequence of predicted instruction addresses, that software executing in the instruction execution pipeline 200 is to execute. This instruction sequence identification includes branch prediction, which uses various execution state information (such as current instruction pointer address, and branch prediction history that, in various examples, includes data indicating the history of whether particular branches were taken or not, and/or other data). The branch predictor 302 may mispredict, in which case the branch predictor 302 and other portions of the instruction execution pipeline 200 perform actions to remedy the misprediction, such as quashing operations for instructions from a mispredicted branch path, as well as the branch predictor 302 changing the instruction addresses to the correct branch path. There are a wide variety of branch prediction techniques and in various examples, the branch predictor 302 uses any technically feasible branch prediction technique to identify a sequence of predicted instruction addresses.

The prediction queue 304 stores predicted addresses from the branch predictor 302. The prediction queue 304 acts as a decoupling queue between the branch predictor 302 and the rest of the instruction fetch and decode unit 202, allowing the timing of operations of the branch predictor 302 to not be dependent on the timing of the operations of the remainder of the instruction fetch and decode unit 202. The format of the predicted addresses output by branch predictor 302 and stored in the prediction queue 304 is in the form of predicted address blocks, which are groups of instruction addresses defined by a range.

A shared fetch logic 305 operates on predicted address blocks, sending addresses from such predicted address blocks to the operation cache path 301, instruction cache path 303, or both, based on whether addresses corresponding to the predicted address blocks are determined to be serviceable by the operation cache path 301 due to corresponding translations being stored in the operation cache. More specifically, the shared fetch logic 305 includes an operation cache tag lookup 310 that probes the operation cache tag array 306 to determine whether any addresses of a particular predicted address block are stored in the operation cache. For a particular predicted address block, based on this lookup, the fetch control circuit 313 generates either or both of operation cache queue entries or instruction cache queue entries for servicing by the operation cache path 301 and/or the instruction cache path 303. If at least one operation cache queue entry is generated for a particular predicted address block, then the operation cache path 301 services that operation cache queue entry, retrieving cached decoded operations from the operation cache and forwarding such cached decoded operations to the operations queue 328 for processing by the remainder of the instruction execution pipeline 200. For predicted address blocks that are not fully serviceable by the operation cache path 301 (i.e., for which some-but-not-all, or none, of the addresses of the predicted address block have corresponding decoded instructions stored in the operation cache), the instruction cache path 303 partially or fully services that predicted address block by fetching instruction bytes from the instruction cache and then decoding those instruction bytes. The operation cache queue entries and instruction cache queue entries reflect the work that is to be performed by the operation cache path 301 and/or instruction cache path 303 for a particular predicted address block.

The cache queue entries output by the shared fetch logic 305 include indications that allow the operation cache path 301 and instruction cache path 303 to coordinate regarding the relative order of the addresses to be serviced. More specifically, this coordination to follow relative program order is facilitated by including, for the cache queue entries flowing to each of the operation cache path 301 and the instruction cache path 303, indications of whether the opposite path (i.e., the instruction cache path 303 for the operation cache path 301 or the operation cache path 301 for the instruction cache path 303) is to obtain decoded micro-operations for instructions immediately prior to the instruction addresses for the particular cache queue entry. If such an indication is present, then operation cache path 301 or the instruction cache path 303 wait for the opposite path to service such immediately prior instruction addresses before servicing the instruction addresses for which the "wait" indication is present. By waiting in this manner, the decoded micro-operations are output to the operations queue 328 in program order. The operations queue 328 acts as the endpoint or final stage for the instruction fetch and decode unit 202. More specifically, the operations queue 328 stores the program-order output of the operation cache path 301 and instruction cache path 303 for servicing by the rest of the instruction execution pipeline 200. The operations queue 328 also acts as a decoupling buffer that decouples the operation timing of the instruction fetch and decode unit 202 from the operation timing of subsequent stages of the instruction execution pipeline 200.

Figure 4A:
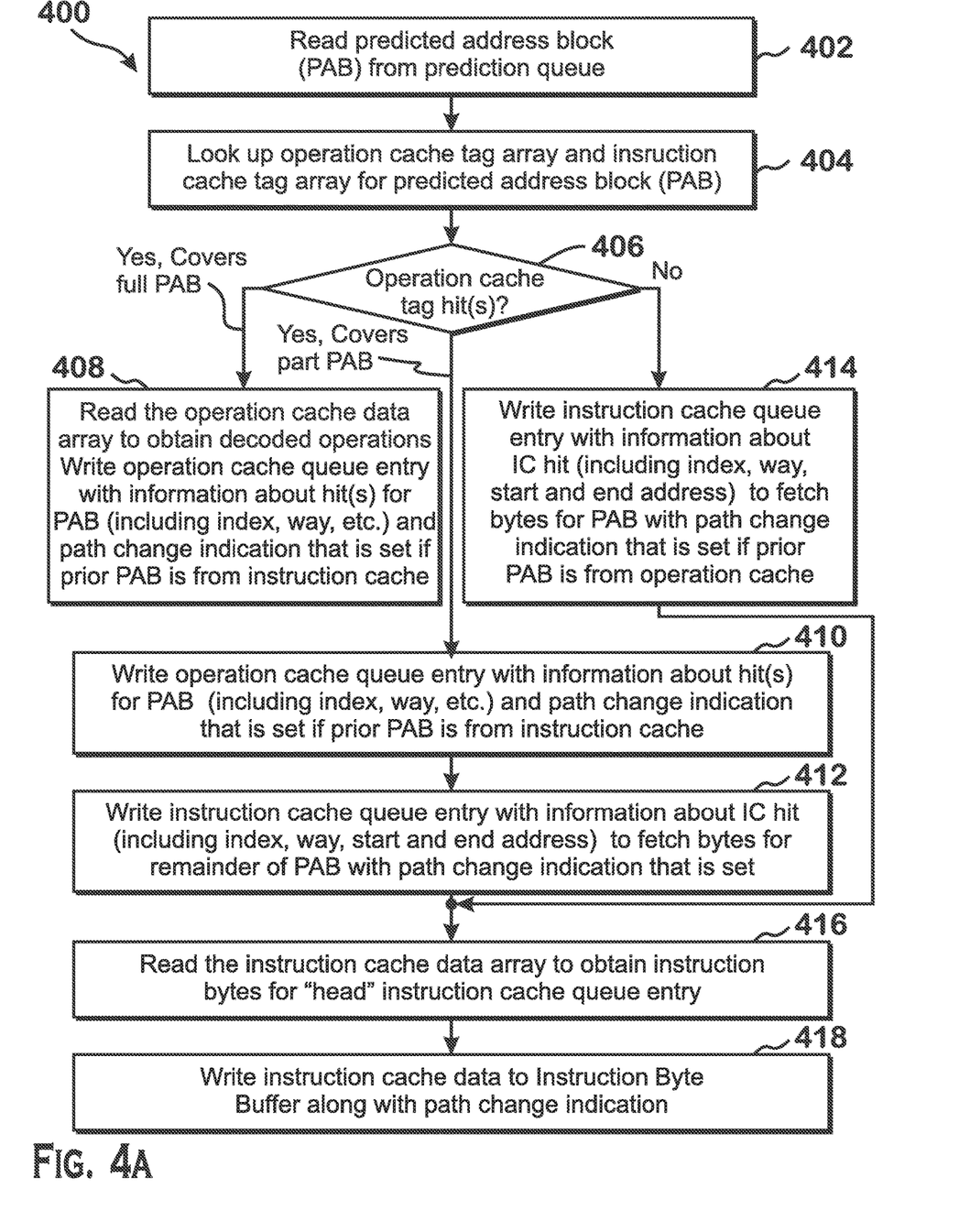
FIG. 4A is a flow diagram of a method of operation of the shared fetch logic of the instruction fetch and decode unit, according to an example.
Figure 4B:
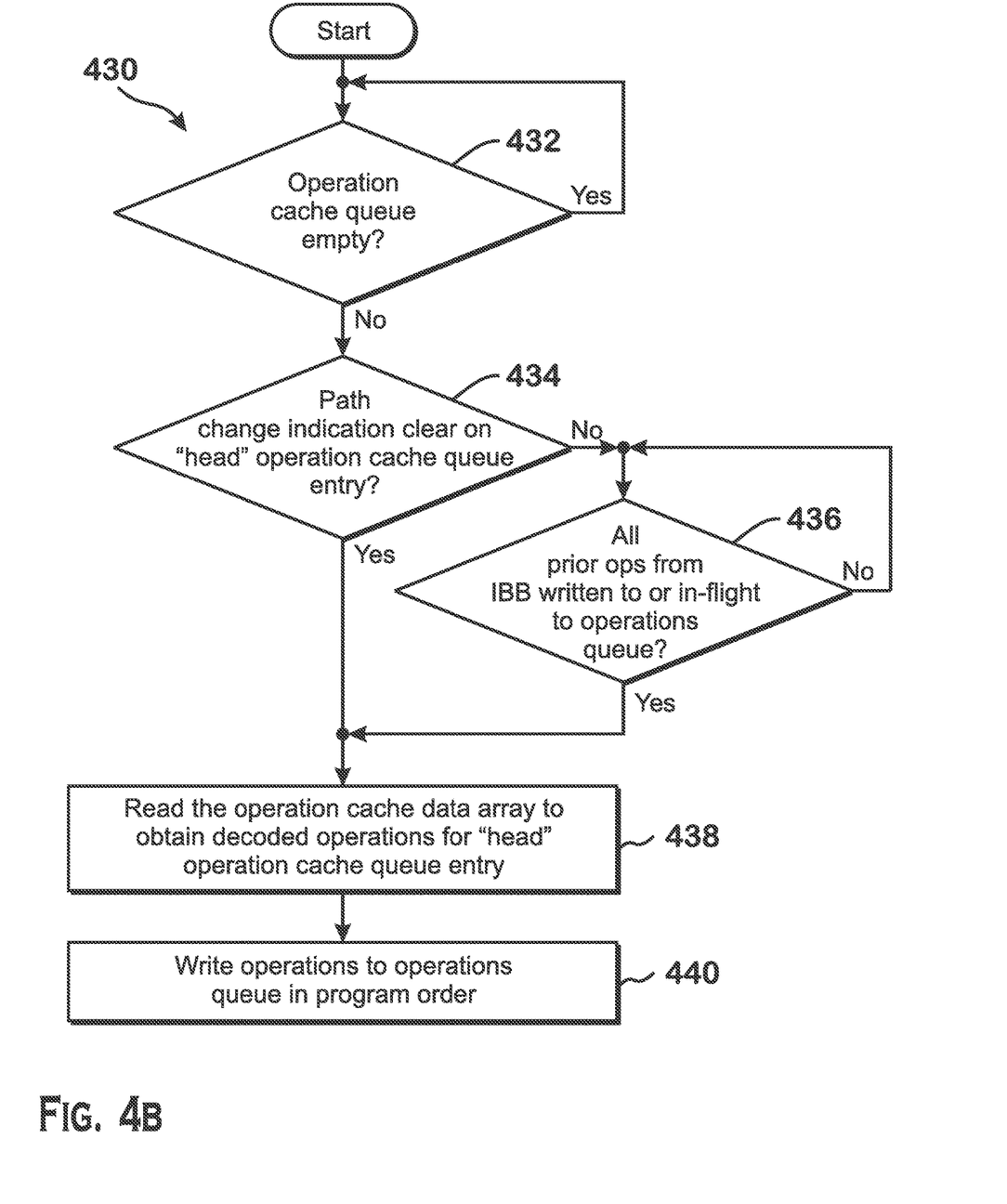
FIG. 4B is a flow diagram of a method for processing entries of an operation cache queue to fetch cached decoded micro-operations from an operation cache, according to an example.
Figure 4C:
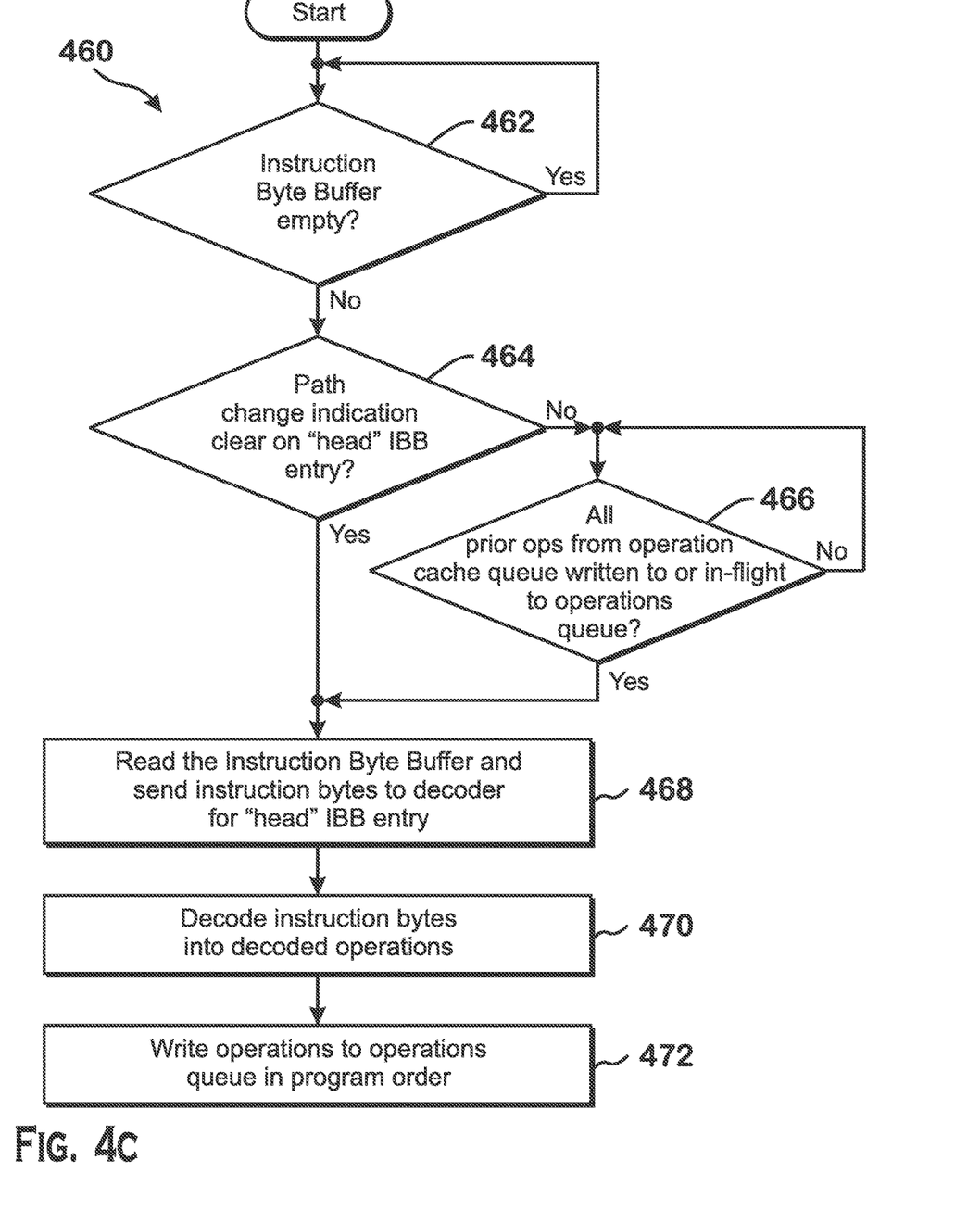
FIG. 4C is a flow diagram of a method for fetching and decoding instruction bytes stored in the instruction byte buffer, according to an example.

Operations of the shared fetch logic 305, the operation cache path 301 and the instruction cache path 303 are now described in greater detail with respect to the individual components of those paths that are illustrated and including additional detail, and also with reference to FIGS. 4A-4C. Specifically, FIG. 4A illustrates operations of the shared fetch logic 305, FIG. 4B illustrates operations of the operation cache path 301, and FIG. 4C illustrates operations of the instruction cache path 303.

FIG. 4A is a flow diagram of a method 400 of operation of the shared fetch logic 305, according to an example. Although described in the context of FIGS. 1-3, those of skill in the art will understand that any system that performs the steps of FIG. 4A in any technically feasible order falls within the scope of the present disclosure.

The method 400 begins at step 402, where the operation cache tag lookup 310 and instruction cache tag lookup 312 retrieve a predicted address block from the prediction queue 304. At step 404, the operation cache tag lookup circuit 310 and the instruction cache tag lookup circuit 312 consume the predicted address block to determine whether the operation cache stores cached decoded operations for all, part, or none of the predicted address block. Although any technically feasible technique for doing so is possible, an example of detailed lookup operations for looking up predicted address blocks is now provided.

According to this example, the operation cache tag lookup circuit applies an address representative of the predicted address block to the operation cache tag array 306 to determine if there are any hits for the predicted address block in the operation cache. The operation cache is a set associative cache in which each index is associated with a particular set and each tag is associated with one or more ways. The tag corresponds to high order bits of an address (such as bits [47:12] of an address) and the index corresponds to bits that are the next lower-order bits of an address (such as bits [11:6] of an address). It is possible for the tag to be a partial tag, which is a version of the full tag shortened through some technique (such as hashing). Throughout this disclosure, it should be understood that the term "tag" can be replaced by "partial tag" where appropriate.

The operation cache tag lookup 310 applies an address representative of the predicted address block to the operation cache tag array 306 as follows. The operation cache tag lookup 310 applies an index derived from the predicted address block to the operation cache tag array 306, which outputs tags that are in the set identified by that index. A hit occurs if a tag derived from the predicted address block matches one or more of the read out tags.

Each hit for a combination of index and tag indicates that there is an entry in the operation cache that may store translated micro-operations for one or more instructions in the predicted address block. Because the operation cache stores entries corresponding to one or more individual instructions that may not completely cover an instruction cache line, information in addition to just the tag and index is required to indicate which specific instructions, out of all the instructions in the range of addresses corresponding to the predicted address block, corresponds to a particular hit. This identification information is stored as a start offset value in each entry of the operation cache tag array 306. More specifically, typical instruction caches store instructions on the granularity of cache lines. In other words, a cache hit indicates that a specific amount of data that aligns with the portion of an address represented by the index and tag is stored in the cache. However, the operation cache stores entries (decoded micro-operations) for one or more individual instructions covering an address range smaller than a cache line. Thus a hit for a specific instruction in the operation cache requires a match of the index and tag, which represent high order bits of the address (e.g., bits [47:6]), as well as a match to the start offset that represents the low order bits of the address (e.g., bits [5:0]) that are aligned down to the byte level (for some instruction set architectures instructions can only exist at 2- or 4-byte granularities and therefore bit[0] or bits[1:0] of the offset can be excluded).

As described above, start offset information is stored in all entries in the operation cache tag array 306. To identify the range of instruction addresses covered by the cached decoded micro-operations stored in the operation cache, each entry in the operation cache tag array 306 stores information indicating the end offset of the instructions corresponding to that entry, since the operation cache entries can be variable in size. This end offset is stored as the address offset of the next instruction after the last instruction corresponding to the entry. The purpose of the information indicating the next instruction offset is to allow the hit status for the next op-cache entry to be looked up in the same cycle if that next instruction has decoded micro-operations stored in the operation cache. By comparing the end offset of the first entry with the start offset of the other tag array entries with matching tags at the same index, the second entry is identified if present. Similarly, the end offset of the second entry is compared to the start offset of the other tag array entries with matching tags at the same index to find the third entry if present.

In sum, the offset information allows for identification of the specific address range in a predicted address block that is covered by an operation cache entry hit (via a match to a tag when an index is applied) and allows the operation cache tag lookup 310 to identify the address of the next instruction that is not covered by that entry. When an index is applied to the operation cache tag array 306, multiple entries are read out. Each entry includes a tag, a start offset, and an end offset (also called next instruction offset). A match between both the tag and the start offset of an operation cache entry and the tag and start offset of the predicted address block signals an operation cache hit for the first entry. The end offset of the first entry is compared to the start offset of the other entries that also matched the tag of the predicted address block to identify the second entry. The end offset of the second entry is used to chain together sequential hit detections for multiple entries in a single cycle as described elsewhere herein. For each of the entries that were identified, the end offset is compared to the end offset of the predicted address block. When the end offset of the predicted address block is matched or exceeded, that block has been fully covered and further chained entries are ignored for the processing of that predicted address block.

At step 406, the operation cache tag lookup circuit 310 determines whether there is at least one hit in the operation cache tag array 306. If there is at least one hit and the at least one hit covers all instructions for the full predicted address block, then the method 400 proceeds to step 408. If there is at least one hit and the at least one hit covers some but not all instructions for the predicted address block, then the method 400 proceeds to step 410. If there are no hits in the operation cache tag array 306, then the method proceeds to step 414.

At step 408, the fetch control circuit 313 generates and writes an operation cache queue entry with information about the hits for the predicted address block in the operation cache. The operation cache queue entry includes information that indicates the index and way in the operation cache for each hit and an indication regarding whether servicing the addresses for this operation cache queue entry requires a path change. The "way" is stored because the set (which corresponds to index) and way identifies a unique entry in the operation cache. The way is unique for each combination of tag and offset and uniquely identifies a single entry in a set identified by an index. A path change occurs when the instructions immediately preceding the instructions serviced by this operation cache queue entry are serviced by the instruction cache path 303. Thus the indication is set if the prior predicted address block is serviced by the instruction cache path 303 (or more specifically, if the last instructions of the prior predicted address block are serviced by the instruction cache path 303). The operation cache queue entries are serviced by the operation cache path 301 as described with respect to FIG. 4B.

Turning back to step 406, if the hits in the operation cache indicate that some but not all of the predicted address block are covered by the operation cache, then the method 400 proceeds to step 410. At step 410, the fetch control circuit 313 generates operation cache queue entries for the operation cache path 301 and writes those operation cache queue entries to the operation cache queue 314. The operation cache queue 314 acts as a decoupling buffer, isolating the timing with which the shared fetch logic 305 processes the predicted address blocks and creates operation cache queue entries from the timing with which the operation cache data read circuit 320 consumes the operation cache queue entries, reads the operation cache data array 322, and outputs decoded operations to the operations queue 328 in program order. These operation cache queue entries include the index and way in the operation cache for each hit and a path change indication indicating whether there is a path change from immediately prior instructions. More specifically, the path change indication indicates whether the instructions immediately prior to the instruction addresses serviced by a particular cache queue entry are to be serviced by the instruction cache path 303. Also, at step 412, the fetch control circuit 313 generates instruction cache queue entries for storage in the instruction cache queue 315. The instruction cache queue entries include the index and way of the instruction cache in which the hits occur, the start offset and end offset to fetch from the instruction cache and an indication that a path change occurs for the first such entry. The start offset written to the instruction cache queue is the end offset of the last operation cache entry that was hit for this predicted address block. The end offset written to the instruction cache queue is the end offset of the predicted address block. The path change indication is set for this instruction cache queue entry because the previous instructions, which are of the same predicted address block, are serviced by the operation cache path 301.

Turning again back to step 406, if there are no hits for the predicted address block in the operation cache, then the method 400 proceeds to step 414. At step 414, the fetch control circuit 313 generates instruction cache queue entries for storage in the instruction cache queue 315. The instruction cache queue entries include the index and way of the instruction cache in which the hits occur, the start offset and end offset to fetch from the instruction cache and an indication of whether a path change occurs for the first such entry. The start offset written to the instruction cache queue is the start offset of the predicted address block. The end offset written to the instruction cache queue is the end offset of the predicted address block. This indication is set if the instructions immediately prior to the instructions of the first entry are to be serviced by the operation cache path 301.

After either steps 412 or 414, the method 400 proceeds to step 416. At step 416, the instruction cache data read circuit 316 reads the instruction cache data array 318 based on the instruction cache queue entries of the instruction cache queue. Specifically, the instruction cache data read circuit 316 accesses the entries specified by the index and way for a particular instruction cache queue entry and obtains the instruction bytes from the instruction cache. It is possible for some instructions not to be stored in the instruction cache or the operation cache, in which case the instruction bytes would have to be fetched from a higher level cache or system memory. The instruction cache path 303 would service such situations as well. At step 418, the instruction cache data read circuit 316 writes the instruction bytes read from the instruction cache into the instruction byte buffer 324 for decoding into decoded micro-operations by the decoder 326.

In an implementation, the determination and lookup steps (step 404 and step 406) occur over several cycles and in a pipelined manner (and thus at least partially overlapping in time) with respect to the steps of generating the operation cache queue entries and instruction cache queue entries (steps 408, 410, 412, and 414). An example of such operations, in which examination of the tag arrays and generation of the cache queue entries is performed in a pipelined manner at least partially overlapping time is now provided.

According to this example, for any particular predicted address block for which a hit occurs in the operation cache, the operation cache tag lookup circuit 310 identifies a first offset to use as the lowest instruction address offset for which a hit occurs. In any particular cycle, identifying this first offset depends on several factors, including whether the current cycle is the first cycle in which the operation cache tag lookup 310 is examining the current predicted address block. More specifically, the operation cache tag lookup 310 is capable of identifying multiple hits in the operation cache tag array 306 in a single cycle. However, there is a limit to the number of hits the operation cache tag lookup 310 can examine in one cycle. If the operation cache tag lookup 310 is examining a particular predicted address block for a second, or higher than second, cycle, then the first offset to use for that cycle is specified by the end offset specified by the last hit of the previous cycle (in other words, the last hit of the previous cycle provides the first offset to use this cycle). Otherwise (i.e., if the current cycle is the first cycle that a predicted address block is being examined by the operation cache tag lookup 310), a different technique is used to identify the first offset to use from the operation cache tag array 306.

More specifically, if the current cycle is the first cycle in which the operation cache tag lookup 310 is examining the current predicted address block, then one of the following is true:

there was a hit in the operation cache for the previous predicted address block that indicated that the next instruction for which there is a hit in the operation cache belongs in the next predicted address block relative to that previous predicted address block (i.e., the entries in the operation cache tag array 306 include an indication that the entry spans into a sequential predicted address block. When this "spanning" indication is set, the end offset refers to an offset in the sequential predicted address block), the last instruction of the previous predicted address block was serviced by the instruction cache path 303 (i.e., no decoded operations were stored in the operation cache for that last instruction); or the current predicted address block represents the target of a taken branch.

In the case that there was an operation cache entry hit in the previous predicted address block that indicated that the op cache entry spans into the sequential predicted address block, the end offset from that entry provides the first offset for the current predicted address block.

In the case that the last instruction of the previous predicted address block was serviced by the instruction cache path 303, the first offset used is the start offset of the predicted address block. In an implementation, the operation cache tag will not be looked up for this case and the instruction cache path 303 will be used. However, other implementations that do not allow "spanning" operation cache entries can choose to loop up the operation cache tag hit and use the operation cache path 301 in case of a hit.

In the case that the current predicted address block represents the target of a taken branch, the first offset used is the start offset of the predicted address block.

When an index is applied to the operation cache tag array 306, multiple entries are read out and used in the operation cache tag lookup 310. Each entry includes a tag, a start offset, and an end offset (also called next instruction offset). A match between both the tag and the start offset of an operation cache entry and the tag of the predicted address block and first offset just described signals an operation cache hit for the first entry. The end offset of the first entry is compared to the start offset of the other entries that also matched the tag of the predicted address block to identify the second entry. The end offset of the second entry is furthermore used to chain together sequential hit detections for multiple entries in a single cycle as described elsewhere herein. The operation cache tag lookup 310 repeats this operation in the same cycle until one or more of the following occurs: the maximum number of sequential operation cache entries for a single cycle is reached or the most recently-examined operation cache tag array entry indicates that the next offset exceeds the end offset of the predicted address block.

The operation cache has several properties that allow for multiple hits to occur in a single cycle. More specifically, the fact that the operation cache is set associative, combined with the fact that all hits in a single predicted address block fall in the same set, allows multiple hits to occur in a single cycle. Due to this property, when an index, which is derived from the current predicted address block, is applied to the operation cache tag array 306, all entries that could belong in the predicted address block are found in the same set. In response to the index being applied to the operation cache tag array 306, all entries of the operation cache tag array 306 are read out (due to the nature of set associative caches). The operation cache tag lookup 310 is thus able to obtain the first entry based on the first entry offset described above. Then the operation cache tag lookup 310 is able to obtain the next entry by using the next instruction address of the first entry to match to the offset of one of the already read-out entries, and to continue sequencing in that manner through the entries of the operation cache tag array 306 already read out this cycle until either the number of entries that can be sequenced in one cycle is reached or until there are no more sequential entries to read (e.g., the operation cache does not store decoded micro-operations for the next instruction after an instruction that hits in the operation cache).

In sum, the fact that all entries for any particular predicted address block fall in a single set means that when the index is applied to the operation cache tag array 306, the offsets and next instruction addresses for all entries that could match in that predicted address block are read out. This fact allows simple sequential logic to be used to chain through multiple entries of the operation cache tag array 306 within the clock cycle period. If entries for a single predicted address block could be found in multiple sets, then chaining through multiple entries would be difficult or impossible because an index would need to be applied to the operation cache tag array 306 multiple times, which would take longer. Thus reading through multiple entries of the operation cache tag array 306 improves operation speed of the operation cache path 301 and also improves compactness of the operation cache queue entries by allowing information for multiple hits in the operation cache to be written to the operation cache queue 314 in a single cycle.

Although any technically feasible manner may be used to ensure that all entries for any particular predicted address block fall within the same set of the operation cache, one particular technique is now described. According to this technique, the branch predictor forms all predicted address blocks so that the addresses are within a particular aligned block size, such as a 64-byte aligned block. The predicted address blocks do not have to start or end on an aligned boundary, but they are not allowed to span the aligned boundary. If using an implementation of branch predictor 302 that does not naturally observe this restriction, additional combinational logic can be inserted between branch predictor 302 and shared fetch logic 305 to break up any predicted address blocks that span alignment boundaries into multiple blocks for the shared fetch logic 305 to process. This alignment means that all legal start offsets within a predicted address block differ only in the lower order bits. The index used to lookup tags in the operation cache tag array 306 (which defines the set) has none of these lowest order bits. By having none of these lowest order bits, the index cannot vary for different addresses in a single pre-dicted address block and thus the set must be the same for any particular operation cache entries needed to satisfy that predicted address block.

The just-described operation of reading multiple entries out from the operation cache tag array 306, using the next instruction offsets in sequence may be referred to herein as "sequential tag reads from the operation cache tag array 306" or via similar phrasing.

Once the operation cache tag lookup 310 has determined that the sequential tag reads from the operation cache tag array 306 is complete for the current cycle, the operation cache tag lookup 310 generates an operation cache queue entry for storage in the operation cache queue 314. The operation cache queue entry includes information that indicates the index and way in the operation cache for each hit indicated by the operation cache tag array 306 for the current cycle, so that the micro-operations can later be read out of the operation cache data array 322. In addition, each operation cache queue entry includes an indication of whether the instruction immediately prior to the first hit represented by the operation cache queue entry is to be serviced by the instruction cache path 303 (i.e., due to there being no corresponding set of cached micro-operations in the operation cache). This indication assists with storing micro-operations in the operations queue 328 in program order (i.e, the order indicated by the sequence of instructions executed for the software being executed), described in greater detail elsewhere herein.

The fetch control logic 313 determines whether a particular operation cache queue entry includes this indication of whether the instruction immediately prior to the first hit is to be serviced by the instruction cache path 303 as follows. If the operation cache queue entry corresponds to the second or later cycle that a particular predicted address block is examined by the operation cache tag lookup 310, then the instruction immediately prior to the operation cache queue entry is not serviced by the instruction cache path 303, because that instruction is part of a multi-cycle read for a single predicted address block. Thus, in the previous cycle, the operation cache tag lookup 310 determined that the operation cache stores decoded micro-operations for the immediately previous instruction.

If the operation cache queue entry corresponds to the first cycle that a particular predicted address block is examined by the operation cache tag lookup 310, then a determination is made based on whether the prior predicted address block was fully covered by the operations cache. In the case the prior predicted address block was fully covered by the operation cache (as also shown in "Yes, Covers full PAB" are out of the decision block 406 of method 400) then the instruction immediately prior to the operation cache queue entry is not serviced by the instruction cache path 303. If the prior predicted address block was not fully covered by the operation cache then the instruction immediately prior to the operation cache queue entry is not serviced by the instruction cache path 303.

Turning now to the instruction cache side of the shared fetch logic 305, the instruction cache tag lookup circuit 312 consumes and processes prediction queue entries as follows. The instruction cache tag lookup 312 examines a predicted address block, obtains the index of the predicted address block and applies that index to the instruction cache tag array 308 to identify hits. The instruction cache tag lookup 312 provides information indicative of hits to the fetch control circuit 313. In some implementations, it is possible for the size of the predicted address block to be greater than the number of addresses that the instruction cache tag lookup 312 can look up in one cycle. In this situation, the instruction cache tag lookup 312 sequences through different address range portions of the predicted address block in program order and identifies hits for each of those address range portions. Based on these hits, the fetch control circuit 313 generates instruction cache queue entries for storage in the instruction cache queue 315. These instruction cache queue entries include information indicating the hits in the instruction cache, such as index and way information, as well as information indicating whether a path change occurs for the specific instruction cache queue entry. Since the choice between taking the operation cache path 301 and instruction cache path 303 is independent of the instruction cache hit status, those skilled in the art will see that the instruction cache tag lookup can be done either in the shared fetch logic 305 or in the instruction cache path 303 based on various tradeoffs not directly related to the techniques described herein.

FIG. 4B is a flow diagram of a method 430 for processing entries of the operation cache queue 314 to fetch cached decoded micro-operations from the operation cache, according to an example. Although described in the context of FIGS. 1-3, those of skill in the art will understand that any system that performs the steps of FIG. 4B in any technically feasible order falls within the scope of the present disclosure.

At step 432, the operation cache data read circuit 320 determines whether the operation cache queue 314 is empty. If empty, the method 430 performs step 432 again. If not empty, the method 430 proceeds to step 434. At step 434, the operation cache data read circuit 320 determines whether the path change indication for the "head" (or "next") cache queue entry is set. If the path change indication is set (is not clear), then the operation cache queue entry needs to wait for the instruction path before being processed and thus the method 430 proceeds to step 436. If the path change indication is not set (is clear), then no waiting occurs and the method 430 proceeds to step 438. At step 436, the operation cache data read circuit 320 determines whether all micro-operations prior to those represented by the operation cache queue entry are written to the operations queue 328 or are currently in flight in the process of being decoded and written to the operations queue 328. If all micro-operations prior to those represented by the operation cache queue entry are written to the operations queue 328 or are currently in flight in the process of being decoded and written to the operations queue 328, then the method 430 proceeds to step 438, and if not all micro-operations prior to those represented by the operation cache queue entry are written to the operations queue 328 or are currently in flight in the process of being decoded and written to the operations queue 328, then the method returns to step 436.

At step 438, the operation cache data read circuit 320 reads the operation cache data array 322 to obtain the cached decoded micro-operations based on the contents of the operation cache queue entry. At step 440, the operation cache data read circuit 320 writes the read-out micro-operations to the operations queue 328 in program order.

A detailed example of steps 438 and 440 is now provided. According to this example, the operation cache data read circuit 320 obtains an index and tag from the operation cache queue entry and applies that index and tag to the operation cache data array 322 to obtain the decoded micro-operations for the operation cache queue entry. Because operation cache queue entries are able to store data for multiple hits, the operation cache data read circuit 320 performs the above lookup one or more times per operation cache queue entry depending on the number of hits represented by that entry. In some implementations, the operation cache data read circuit 320 performs multiple lookups from the same operation cache queue 314 entry in a single cycle while in other implementations, the operation cache data read circuit 320 performs one lookup per cycle.

FIG. 4C is a flow diagram of a method 460 for fetching and decoding instruction bytes stored in the instruction byte buffer 324, according to an example. Although described in the context of FIGS. 1-3, those of skill in the art will understand that any system that performs the steps of FIG. 4C in any technically feasible order falls within the scope of the present disclosure.

At step 462, the instruction byte buffer 324 determines whether the instruction byte buffer 324 is empty. If the instruction byte buffer is empty, then the method 460 returns to step 462 and if the instruction byte buffer is not empty, then the method 460 proceeds to step 464. At step 464, the instruction byte buffer 324 determines whether the path change indication for the "head" (or "next") entry in the instruction byte buffer 324 is clear (indicates that a path change is not required for that entry). If the indication is not clear (i.e., the indication is set), then the method 460 proceeds to step 466 and if the indication is clear (i.e., the indication is not set), then the method 460 proceeds to step 468.

At step 466, the instruction byte buffer 324 checks whether all micro-operations for instructions prior to the next entry in program order that are serviced by the operation cache path 301 are written to the operations queue 328 or in flight to being written to the operations queue 328. If all micro-operations for instructions prior to the next entry in program order that are serviced by the operation cache path 301 are written to the operations queue 328 or in flight to being written to the operations queue 328, then the method proceeds to step 468 and if not all micro-operations for instructions prior to the next entry in program order that are serviced by the operation cache path 301 are written to the operations queue 328 or in flight to being written to the operations queue 328, then the method returns to step 466.

At step 468, the instruction byte buffer 324 reads the head entry and sends the instruction bytes of that entry to the decoder 326 for decoding. At step 470, the decoder 326 decodes the instruction bytes according to known techniques to generate decoded micro-operations. At step 472, the decoder 326 writes the decoded micro-operations to the operations queue 328 in program order.

The operations queue 328 provides decoded micro-operations to the reorder buffer 210 and/or other subsequent stages of the instruction execution pipeline 200 as those stages are able to consume those decoded micro-operations. The remainder of the instruction execution pipeline 200 consumes and executes those micro-operations according to known techniques to run the software represented by the instructions from which the micro-operations are derived. As is generally known, such software is able to produce any technically feasible result and perform any technically feasible operation, such as writing result data to memory, interfacing with input/output devices, and performing other operations as desired.

Once decoded, the instruction cache uses the decoded operations to update the operation cache, based on any technically feasible replacement policy. The purpose of these updates is to keep the operation cache current to the state of program execution (e.g., to make sure that recently decoded operations are available in the operation cache for use in decoding instructions in later program flow).

It should be understood that the instruction fetch and decode unit 202 is a pipelined unit, meaning that work at one stage (e.g., the branch predictor) is able to be performed for certain instruction addresses in the same cycle as work at a different stage (e.g., the operation cache tag lookup 310). It should also be understood that the operation cache path 301 and the instruction cache path 303 are independent, parallel units that, although synchronized to output decoded micro-operations in program order, are capable of performing work for the same or different predicted address blocks in the same cycle.

One variation to the above is that instead of using an instruction cache queue 315, the instruction cache path 303 can directly read the prediction block to determine which address ranges to obtain the instruction bytes from. To facilitate this, the fetch control circuit 313 can write information indicative of which addresses to fetch into the prediction queue 304 as the head entry for that queue, and the instruction cache data read circuit 316 can identify the next addresses to use based on the head entry in the prediction queue 304.

The techniques described herein provide an instruction fetch and decode unit having an operation cache with low latency in switching between fetching decoded operations from the operation cache and fetching and decoding instructions using a decode unit. This low latency is accomplished through a synchronization mechanism that allows work to flow through both the operation cache path and the instruction cache path until that work is stopped due to needing to wait on output from the opposite path. The existence of decoupling buffers in the operation cache path 301 (i.e., the operation cache queue 314) and the instruction cache path 303 (i.e., the instruction byte buffer 324) allows work to be held until that work is cleared to proceed for reason of synchronization between the two paths. Other improvements, such as a specially configured operation cache tag array that allows for detection of multiple hits in a single cycle, improves bandwidth by, for example, improving the speed at which entries are consumed from the prediction queue 304 and allows the ability to have implementations that read multiple entries in a single cycle from the operation cache data array 322. More specifically, because the prediction queue 304 advances to the next entry after both the operation cache path 301 and the instruction cache path 303 have read in the current entry (e.g., via the operation cache tag lookup 310 and the instruction cache tag lookup 312), allowing multiple instructions per cycle to be serviced by the operation cache tag lookup 310 speeds up the rate at which prediction queue entries are consumed.

A method for converting instruction addresses of a first predicted address block into decoded micro-operations for output to an operations queue that stores decoded micro-operations in program order, and for subsequent execution by a remainder of an instruction execution pipeline is provided. The method includes identifying that the first predicted address block includes at least one instruction for which decoded micro-operations are stored in an operation cache of an operation cache path; storing a first operation cache queue entry in an operation cache queue, the first operation cache queue entry including an indication indicating whether to wait to receive a signal from an instruction cache path to proceed; obtaining decoded micro-operations corresponding to the first operation cache queue entry from the operation cache; and outputting the decoded micro-operations corresponding to the first operation cache queue entry to the operations queue, at a time that is based on the indication of the first operation cache queue entry indicating whether to wait to receive the signal from the instruction cache path to proceed.

An instruction fetch and decode unit for converting instruction addresses of a first predicted address block into decoded micro-operations for output to an operations queue that stores decoded micro-operations in program order, and for subsequent execution by a remainder of an instruction execution pipeline. The instruction fetch and decode unit includes a shared fetch logic configured to identify that the first predicted address block includes at least one instruction for which decoded micro-operations are stored in an operation cache of an operation cache path, an operation cache queue that stores a first operation cache queue entry, the first operation cache queue entry including an indication indicating whether to wait to receive a signal from an instruction cache path to proceed, and an operation cache data read logic that obtains decoded micro-operations corresponding to the first operation cache queue entry from the operation cache, and to output the decoded micro-operations corresponding to the first operation cache queue entry to the operations queue, at a time that is based on the indication of the first operation cache queue entry indicating whether to wait to receive the signal from the instruction cache path to proceed.

A processor includes an instruction fetch and decode unit for converting instruction addresses of a first predicted address block into decoded micro-operations for output to an operations queue that stores decoded micro-operations in program order, and for subsequent execution by a remainder of an instruction execution pipeline and the remainder of the instruction execution pipeline. The instruction fetch and decode unit includes a shared fetch logic that identifies that the first predicted address block includes at least one instruction for which decoded micro-operations are stored in an operation cache of an operation cache path, an operation cache queue that stores a first operation cache queue entry, the first operation cache queue entry including an indication indicating whether to wait to receive a signal from an instruction cache path to proceed, and an operation cache data read logic that obtains decoded micro-operations corresponding to the first operation cache queue entry from the operation cache, and to output the decoded micro-operations corresponding to the first operation cache queue entry to the operations queue, at a time that is based on the indication of the first operation cache queue entry indicating whether to wait to receive the signal from the instruction cache path to proceed.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements features of the above disclosure.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for converting instruction addresses of a first predicted address block into decoded micro-operations for output to an operations queue that stores decoded micro-operations in program order, and for subsequent execution by a remainder of an instruction execution pipeline, the method comprising:
providing an index associated with the first predicted address block to an operation cache tag array to obtain a first tag associated with a first operation cache tag array entry and a second tag associated with a second operation cache tag array entry;
in a first computer clock cycle, determining that both the first tag and the second tag match a tag derived from the predicted address block and that an end address associated with the first operation cache tag array entry matches a start address associated with the second operation cache tag array entry;
in the first computer clock cycle, identifying a set of instructions for which decoded micro-operations are stored in an operation cache data array of an operation cache path, as instructions at addresses associated with both the first operation cache tag array entry and the second operation cache tag array entry;
storing a first operation cache queue entry for the set of instructions in an operation cache queue, the first operation cache queue entry including an indication indicating whether to wait to receive a signal from an instruction cache path to proceed;
obtaining decoded micro-operations corresponding to the first operation cache queue entry from the operation cache; and
outputting the decoded micro-operations corresponding to the first operation cache queue entry to the operations queue, at a time that is based on the indication of the first operation cache queue entry indicating whether to wait to receive the signal from the instruction cache path to proceed.

2. The method of claim 1, wherein:
the indication indicates a need to wait for prior micro-operations from the instruction cache path to be written to or in-flight to the operations queue; and
outputting the decoded micro-operations to the operations queue includes waiting until the prior micro-operations from the instruction cache path are written to or in-flight to the operations queue before outputting the decoded micro-operations corresponding to the first operation cache queue to the operations queue.

3. The method of claim 1, wherein:
the indication does not indicate a need to wait for prior micro-operations from the instruction cache path to be written to or in-flight to the operations queue; and
outputting the decoded micro-operations to the operations queue includes outputting the decoded micro-operations corresponding to the first operation cache queue entry without waiting for prior micro-operations from the instruction path.

4. The method of claim 1, further comprising:
converting instruction addresses of a second predicted address block into decoded micro-operations for output to the operations queue and for subsequent execution by the remainder of an instruction execution pipeline, by:
identifying that the second predicted address block includes at least one instruction for which decoded micro-operations are not stored in the operation cache;
storing an instruction cache queue entry in an instruction cache queue;
obtaining instruction bytes for the instruction cache queue entry in an instruction byte buffer, along with an indication indicating whether to wait for prior operations from the operation cache to be written to or in flight to the operations cache;
decoding the instruction bytes to obtain decoded micro-operations corresponding to the instruction byte buffer entry, at a time that is based on the indication indicating whether to wait for the prior operations from the operations cache path; and
outputting the decoded micro-operations corresponding to the instruction byte buffer entry to the operations queue for storage.

5. The method of claim 4, wherein:
the indication indicating whether to wait for the prior operations from the operations cache path indicates a need to wait for the prior operations from the operations cache path; and
decoding the instruction bytes comprises decoding the instruction bytes after the prior operations from the operations cache path are written to or in flight to the operations queue.

6. The method of claim 4, wherein:
the indication indicating whether to wait for the prior operations from the operations cache path indicates no need to wait for the prior operations from the operations cache path; and
decoding the instruction bytes comprises decoding the instruction bytes without waiting for prior operations from the operations cache path to be written to or in flight to the operations queue.

7. The method of claim 1, wherein:
the first predicted address block includes at least one instruction for which decoded micro-operations are stored in an operation cache and at least one instruction for which decoded operations are not stored in the operation cache.

8. The method of claim 1, further comprising:
executing the micro-operations stored in the operations queue.

9. An instruction fetch and decode unit for converting instruction addresses of a first predicted address block into decoded micro-operations for output to an operations queue that stores decoded micro-operations in program order, and for subsequent execution by a remainder of an instruction execution pipeline, the instruction fetch and decode unit comprising:
a shared fetch logic configured to:
provide an index associated with the first predicted address block to an operation cache tag array to obtain a first tag associated with a first operation cache tag array entry and a second tag associated with a second operation cache tag array entry,
in a first computer clock cycle, determine that both the first tag and the second tag match a tag derived from the predicted address block and that an end address associated with the first operation cache tag array entry matches a start address associated with the second operation cache tag array entry, and
in the first computer clock cycle, identify a set of instructions for which decoded micro-operations are stored in an operation cache data array of an operation cache path, as instructions at addresses associated with both the first operation cache tag array entry and the second operation cache tag array entry;
an operation cache queue configured to store a first operation cache queue entry for the set of instructions, the first operation cache queue entry including an indication indicating whether to wait to receive a signal from an instruction cache path to proceed; and
an operation cache data read logic configured to obtain decoded micro-operations corresponding to the first operation cache queue entry from the operation cache, and to output the decoded micro-operations corresponding to the first operation cache queue entry to the operations queue, at a time that is based on the indication of the first operation cache queue entry indicating whether to wait to receive the signal from the instruction cache path to proceed.

10. The instruction fetch and decode unit of claim 9, wherein:
the indication indicates a need to wait for prior micro-operations from the instruction cache path to be written to or in-flight to the operations queue; and
outputting the decoded micro-operations to the operations queue includes waiting until the prior micro-operations from the instruction cache path are written to or in-flight to the operations queue before outputting the decoded micro-operations corresponding to the first operation cache queue to the operations queue.

11. The instruction fetch and decode unit of claim 9, wherein:
the indication does not indicate a need to wait for prior micro-operations from the instruction cache path to be written to or in-flight to the operations queue; and
outputting the decoded micro-operations to the operations queue includes outputting the decoded micro-operations corresponding to the first operation cache queue entry without waiting for prior micro-operations from the instruction path.

12. The instruction fetch and decode unit of claim 9, wherein the shared fetch logic and the instruction cache path are configured to convert instruction addresses of a second predicted address block into decoded micro-operations for output to the operations queue and for subsequent execution by the remainder of an instruction execution pipeline, by:
identifying that the second predicted address block includes at least one instruction for which decoded micro-operations are not stored in the operation cache;
storing an instruction cache queue entry in an instruction cache queue;
obtaining instruction bytes for the instruction cache queue entry in an instruction byte buffer, along with an indication indicating whether to wait for prior operations from the operation cache to be written to or in flight to the operations cache;
decoding the instruction bytes to obtain decoded micro-operations corresponding to the instruction byte buffer entry, at a time that is based on the indication indicating whether to wait for the prior operations from the operations cache path; and
outputting the decoded micro-operations corresponding to the instruction byte buffer entry to the operations queue for storage.

13. The instruction fetch and decode unit of claim 12, wherein:
the indication indicating whether to wait for the prior operations from the operations cache path indicates a need to wait for the prior operations from the operations cache path; and
decoding the instruction bytes comprises decoding the instruction bytes after the prior operations from the operations cache path are written to or in flight to the operations queue.

14. The instruction fetch and decode unit of claim 12, wherein:
the indication indicating whether to wait for the prior operations from the operations cache path indicates no need to wait for the prior operations from the operations cache path; and
decoding the instruction bytes comprises decoding the instruction bytes without waiting for prior operations from the operations cache path to be written to or in flight to the operations queue.

15. The instruction fetch and decode unit of claim 9, wherein:
the first predicted address block includes at least one instruction for which decoded micro-operations are stored in an operation cache and at least one instruction for which decoded operations are not stored in the operation cache.

16. A processor comprising:
an instruction fetch and decode unit for converting instruction addresses of a first predicted address block into decoded micro-operations for output to an operations queue that stores decoded micro-operations in program order, and for subsequent execution by a remainder of an instruction execution pipeline; and
the remainder of the instruction execution pipeline,
wherein the instruction fetch and decode unit comprises:
a shared fetch logic configured to:
provide an index associated with the first predicted address block to an operation cache tag array to obtain a first tag associated with a first operation cache tag array entry and a second tag associated with a second operation cache tag array entry,
in a first computer clock cycle, determine that both the first tag and the second tag match a tag derived from the predicted address block and that an end address associated with the first operation cache tag array entry matches a start address associated with the second operation cache tag array entry, and
in the first computer clock cycle, identify a set of instructions for which decoded micro-operations are stored in an operation cache data array of an operation cache path, as instructions at addresses associated with both the first operation cache tag array entry and the second operation cache tag array entry;

an operation cache queue configured to store a first operation cache queue entry for the set of instructions, the first operation cache queue entry including an indication indicating whether to wait to receive a signal from an instruction cache path to proceed; and an operation cache data read logic configured to obtain decoded micro-operations corresponding to the first operation cache queue entry from the operation cache, and to output the decoded micro-operations corresponding to the first operation cache queue entry to the operations queue, at a time that is based on the indication of the first operation cache queue entry indicating whether to wait to receive the signal from the instruction cache path to proceed.

17. The processor of claim 16, wherein:

the indication indicates a need to wait for prior micro-operations from the instruction cache path to be written to or in-flight to the operations queue; and outputting the decoded micro-operations to the operations queue includes waiting until the prior micro-operations from the instruction cache path are written to or in-flight to the operations queue before outputting the decoded micro-operations corresponding to the first operation cache queue to the operations queue.

18. The processor of claim 16, wherein:

the indication does not indicate a need to wait for prior micro-operations from the instruction cache path to be written to or in-flight to the operations queue; and outputting the decoded micro-operations to the operations queue includes outputting the decoded micro-operations corresponding to the first operation cache queue entry without waiting for prior micro-operations from the instruction path.

* * * * *